(12) United States Patent
Hahn et al.

(10) Patent No.: US 6,402,504 B1
(45) Date of Patent: Jun. 11, 2002

(54) ROTARY PLATEN ASSEMBLY

(75) Inventors: John J. Hahn, Hartford; Theodore B. Lemke, Saukville; Randy J. Krell, West Bend, all of WI (US)

(73) Assignee: MGS Mfg. Group, Inc., Germantown, WI (US)

( * ) Notice: Subject to any disclaimer, the term of this patent is extended or adjusted under 35 U.S.C. 154(b) by 0 days.

(21) Appl. No.: 09/589,823

(22) Filed: Jun. 7, 2000

(51) Int. Cl.⁷ ................................................ B29C 45/16
(52) U.S. Cl. ...................................... 425/574; 425/576
(58) Field of Search ................................ 425/130, 574, 425/575, 576

(56) References Cited

U.S. PATENT DOCUMENTS

| 1,960,187 A | 5/1934 | Page |
| 3,915,608 A | 10/1975 | Hujik |
| 4,243,362 A | 1/1981 | Rees et al. |
| 4,345,965 A | 8/1982 | Lindenmayer et al. |
| 4,424,015 A | 1/1984 | Black et al. |
| 4,726,757 A | 2/1988 | Berry |
| 4,750,875 A | 6/1988 | Shiina |
| 5,221,538 A | 6/1993 | Gasami et al. |
| 5,435,715 A | 7/1995 | Campbell |
| 6,012,914 A | 1/2000 | Loulourgas |

*Primary Examiner*—Tim Heitbrink
(74) *Attorney, Agent, or Firm*—Andrus, Sceales, Starke & Sawall, LLP

(57) ABSTRACT

A rotatable platen assembly is adapted to support a mold used in multi-shot plastic injection molding. The platen assembly includes a non-rotatable machine platen having a central bore formed therethrough. A non-rotatable base plate is connected to the machine platen, the base plate having a central opening aligned with the central bore of the machine platen. A rotating plate is adapted to retain a mold thereon. The rotating plate is provided with a rotatable center axle passing through the central opening in the central bore, and a gear mounted for rotation on the axle. A rack system is engageable with the gear for moving the mold rotating plate between a starting position and a finishing position. A shock absorber arrangement is mounted externally of the base plate for dampening the momentum of the rotating plate between the starting position and the finishing position.

19 Claims, 7 Drawing Sheets

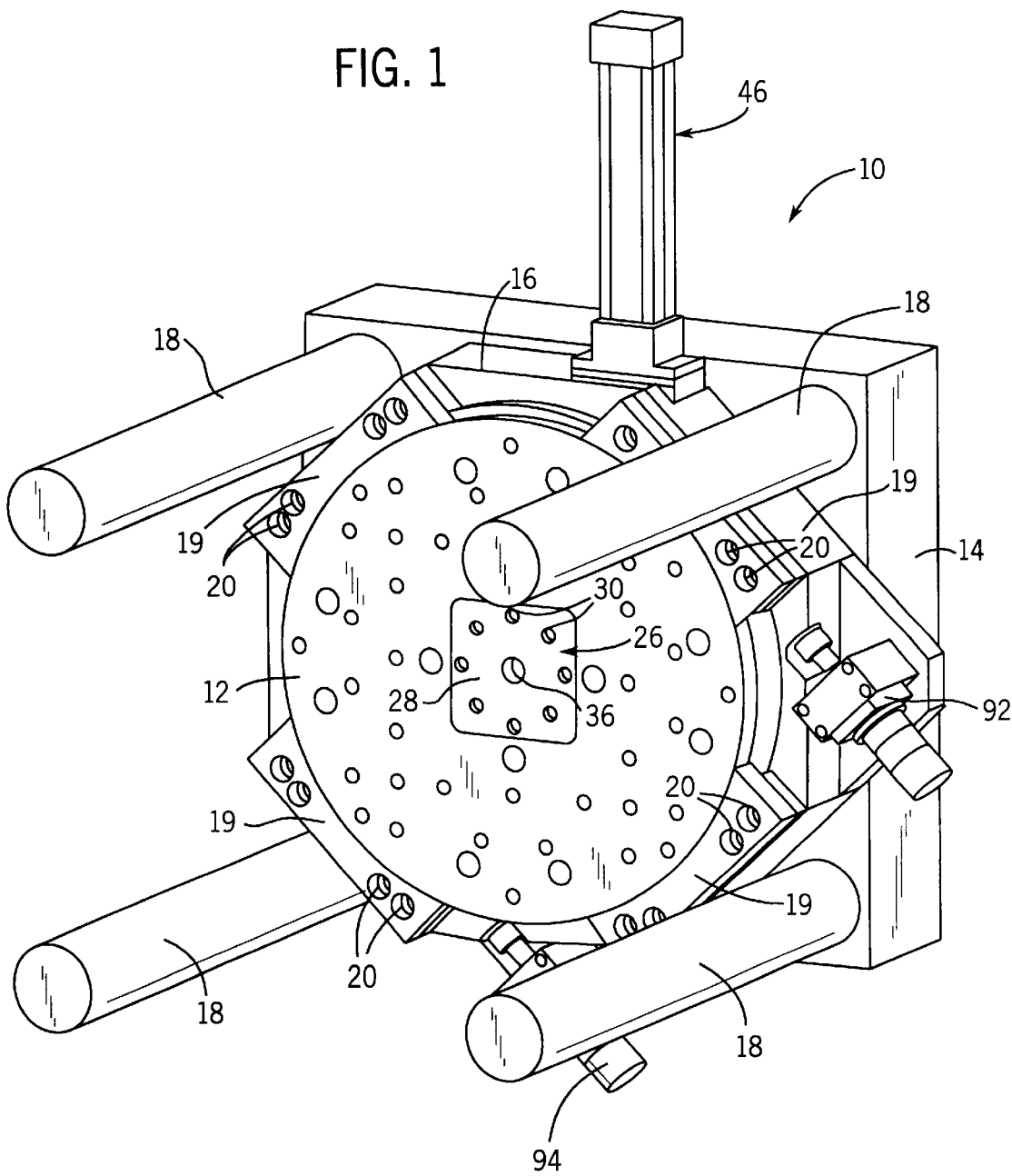

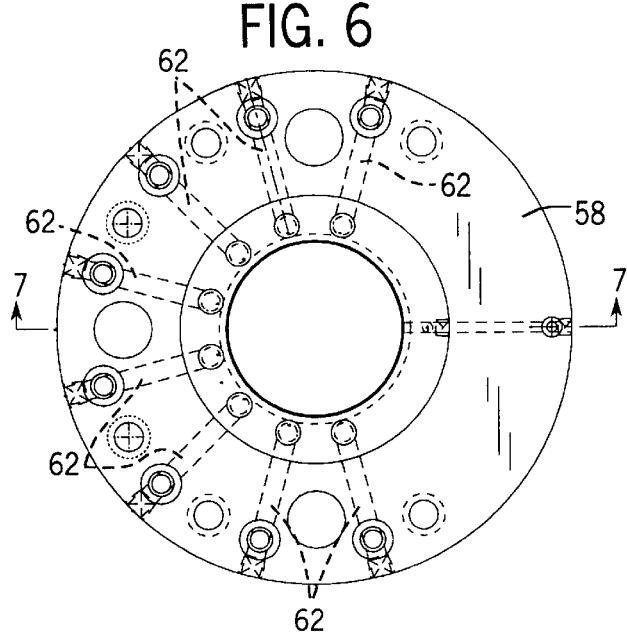
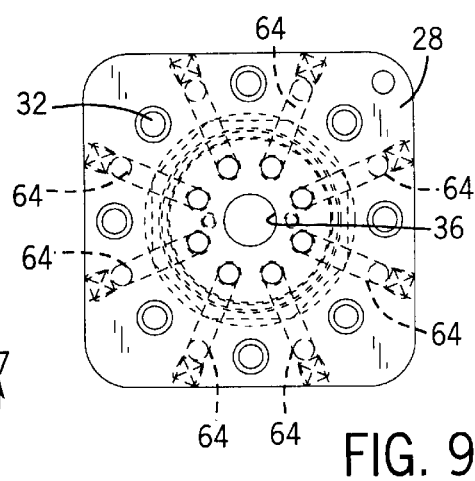
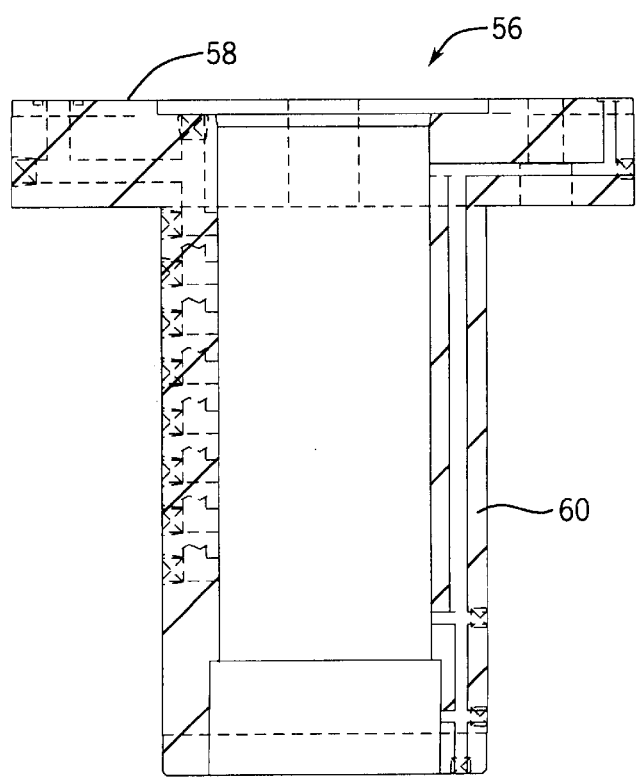
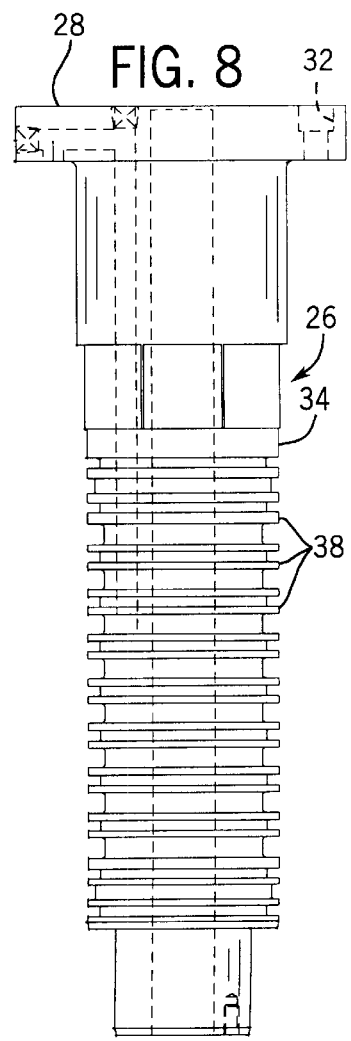

ROTARY PLATEN ASSEMBLY

FIELD OF THE INVENTION

This invention relates broadly to rotary injection molding of plastic components and, more particularly, pertains to rotary platens for supporting molds used in multi-shot injection molding of multi-colored or multi-material plastic parts.

BACKGROUND OF THE INVENTION

In two-shot molding, the mold is turned or indexed by a rotating table platen. The platen is operated by a hydraulic motor or cylinder which rotates the mold 180° for a two-shot cycle. The platen can also be indexed at other increments to accommodate more than two shots. This rotating platen is mounted on the moving platen of the molding machine and cooperates with a fixed metal mold mounted on a fixed platen forming part of the mounting frame in the molding machine.

To produce a two-shot plastic part, first one shot of material is injected into the mold, the mold then opens and the platen rotates the mold 180°, ejects the runner and the mold closes again. A second shot is then injected around the first shot to create a plastic part with two colors or materials. Simultaneously, the first shot is injected again. When the mold opens this time, both runners will eject along with the completed part. The mold will then rotate and close to repeat the cycle again. The rotary platen technique is frequently used because is permits parallel injection. This results in short cycle times, so that production is optimized.

Some prior art rotating platens used to support molds have been deficient in supporting molds because of their weight problems or move at too slow a speed for producing the expected results. Other rotating platens have been designed to rapidly turn the massive mold by using rack and pinion assemblies. However, such rotary platens rely upon expensive and, in many cases, complicated electronic controls, switches and sensors to slow and stop the momentum of the rotary platen, so that it may properly and efficiently cycle again.

Despite the many attempts of the prior art, there remains a need for a rotary platen assembly permitting multi-shot molding of plastic components in molds of large mass, which are driven, slowed and stopped in a simplified, easy to maintain and cost effective manner.

SUMMARY OF THE INVENTION

It is general object of the present invention to provide an injection molding machine having a rotary platen assembly for rotating a mold used in manufacturing multi-color or multi-layer products.

It is one object of the present invention to provide a rotary platen assembly having a shock absorbing arrangement for dampening the momentum of a platen-supported mold of large mass.

It is also an object of the present invention to provide a rotary platen assembly driven by a rack and pinion, and traveling along an arcuate path between a starting position and a finishing position defined by a stop arrangement.

It is another object of the present invention to provide a rotary platen assembly having a shorter cycle time than previous rotary platen designs.

In one aspect of the invention, a rotatable platen assembly is adapted to support a mold used in multi-shot plastic injection molding. The assembly includes a non-rotatable machine platen having a central bore formed therethrough. A non-rotatable base plate is connected to the machine platen, the base platen having a central opening aligned with the central bore of the machine platen. A rotatable support plate is adapted to retain a mold thereon. The platen is provided with a rotatable center axle passing through the central opening and the central bore, and a gear mounted for rotation on the axle. A rack system is engageable with the gear for rotating the mold supporting plate between a starting position and a finishing position. A shock absorber arrangement is mounted externally of the base plate for dampening the momentum of the rotating plate between the starting position and the finishing position. The base plate is provided with a pair of fixed stops spaced apart and defining the starting position and finishing position of the rotating platen travel. The rotating plate is provided with a rotating stop which travels in an arcuate path as the rotating plate rotates. The shock absorbing arrangement includes a pair of shock absorbers secured on respective mounting plates connected to the base plate. The rack system includes a hydraulic cylinder having an extendable and retractable piston rod connected to a rack engageable with the gear. The base plate is formed with a straight passageway or slot receiving the rack, and the arcuate path for guiding the rotating stop therein. A cooling water jacket surrounds the center axle, the water jacket having a radially extending end portion disposed in the base plate and the machine platen, and a cylindrical body portion located in the machine plate. The base plate, the cooling jacket, the center axle and the rotating platen are all formed with a plurality of circuitous cooling fluid channels. The periphery of the rotating plate is engageable with a series of spaced apart jibs anchored to the base plate. A pair of spaced apart electronic sensors is mounted on the base plate for verifying the position of the rotating plate. A first set of bearings is disposed in the base plate and encircles the center axle. A second set of bearings is disposed between the center axle and the water jacket. A lower portion of the center axle is provided with a set of vertically spaced O-rings disposed between an outer wall of the center axle and an inner wall of the body portion of the water jacket. The base plate is provided with a set of cam followers for holding the rack against the gear. The first stops are located 180° apart and the arcuate path is preferably semi-circular.

The invention also contemplates a multi-shot injection molding apparatus having a rack system for moving a mold-supporting rotating plate between a starting position and a finishing position relative to a non-rotating structure. The improvement includes a shock absorbing arrangement associated with the non-rotating structure for cushioning the momentum of the rotating plate and its mold as the rotating plate approaches the finishing position. A non-rotating structure is provided with spaced apart stops along an arcuate path for defining the starting position and finishing position of the rotating plate. The rotating plate is provided with a rotating stop engageable with the spaced apart stops.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a perspective view of a rotary platen assembly embodying the present invention;

FIG. 6 is a fragmentary plan view of the water jacket;

FIG. 7 is a sectional view taken on line 7—7 of FIG. 6;

FIG. 8 is a side view of the center axle; and

FIG. 9 is a top view of the center axle shown in FIG. 8.

DETAILED DESCRIPTION OF THE INVENTION

Figure 1A:
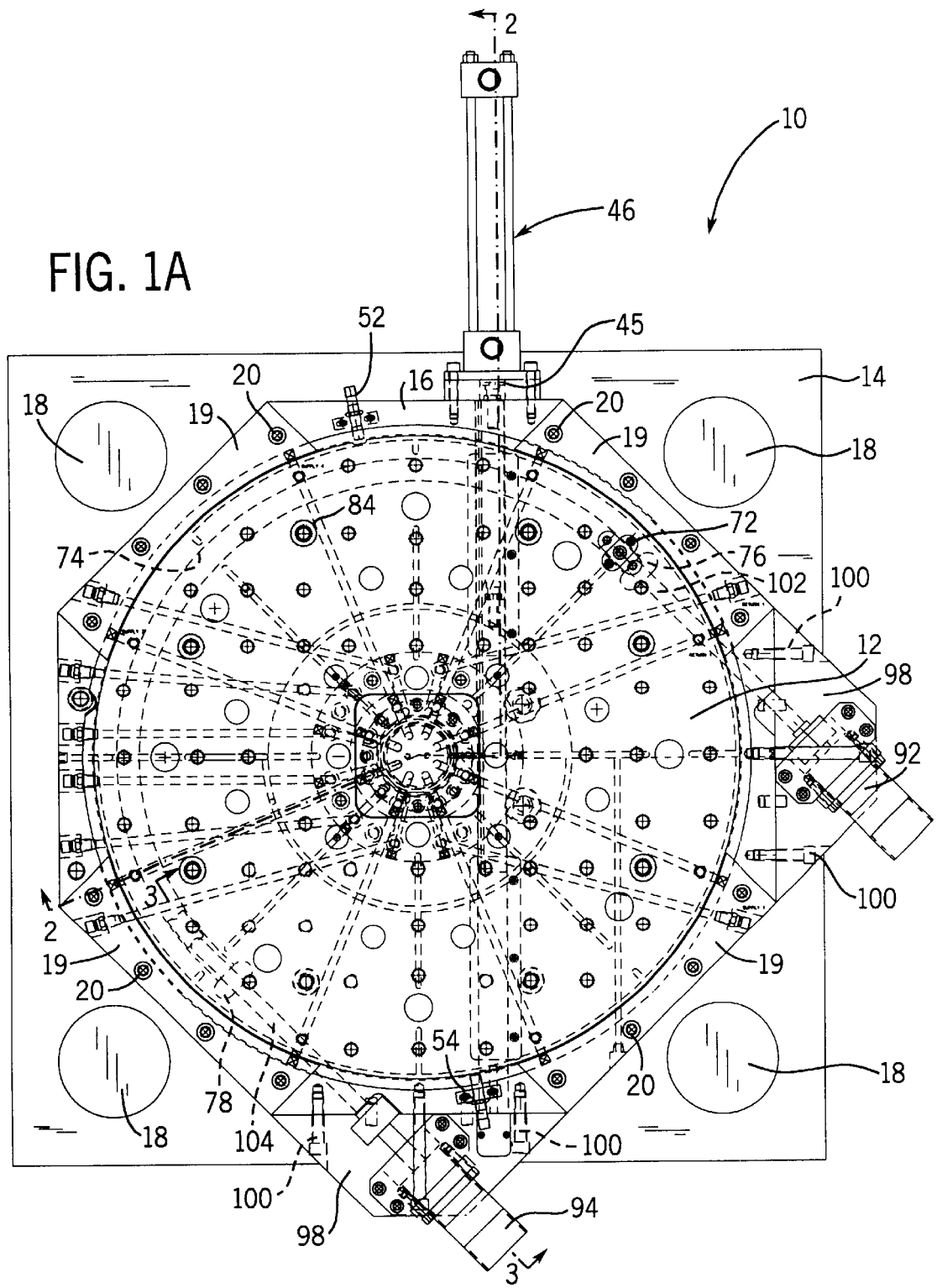
FIG. 1A is a plan view of the rotary platen assembly of FIG. 1.

Referring now to FIGS. 1 and 1A, a rotatable platen assembly embodying the invention and adapted to support a mold used in multi-shot plastic injection molding is generally identified by the reference numeral 10. The rotatable platen assembly 10 is comprised of a rotatable, circular turntable or plate 12 supported on a non-rotatable ejector machine platen 14 via a non-rotatable, octagonal base plate 16. As is well known, the machine platen 14 is movably guided along a set of cylindrical tie bars 18 and is driven by a suitable means for engaging and disengaging the holes supported on the rotating plate 12 with a cooperating fixed mold retained on a fixed platen in the injection molding machine. A set of four retaining gids 19 are fixed outside the periphery of rotating plate 12 at equally spaced intervals to the base plate 16 by fasteners 20.

Figure 2:
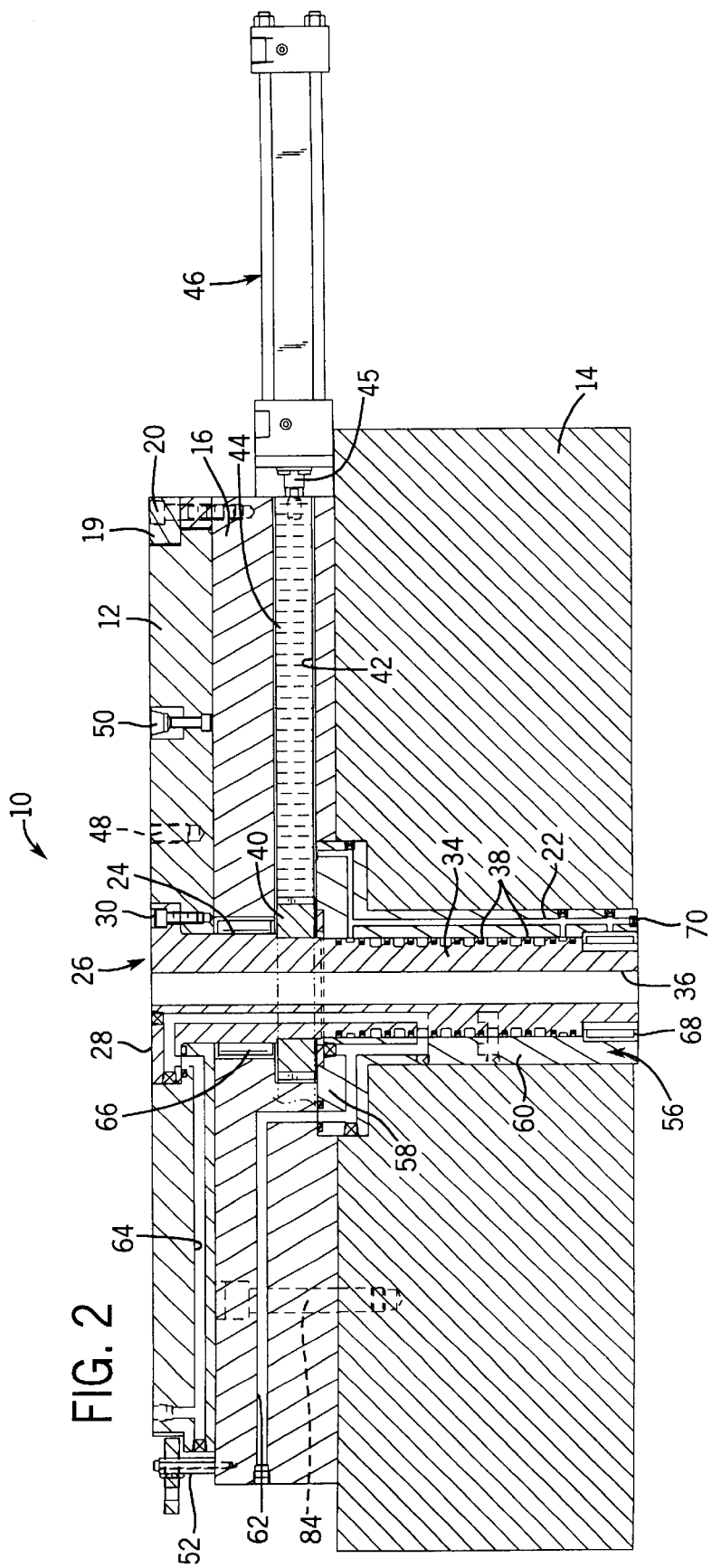
FIG. 2 is a sectional view taken on line 2—2 of FIG. 1A.

As seen in FIG. 2, the machine plate 14 hag a central bore 22 formed therethrough which is aligned with a central opening 24 provided in the base plate 16. The rotating plate 12 is centrally cut away to receive a center axle 26 (FIGS. 8 and 9) having a substantially square top 28 which is joined to the rotating plate 12 by fasteners 30 extending through holes 32, and a substantially cylindrical shaft portion 34 which passes through the aligned bore 22 and opening 24. The center axle 26 has an interior passageway 36 which extends throughout its length and includes a series of O-rings 38 which surround its lower periphery. Attached to and encircling an upper portion of the axle 26 is a pinion gear 40 which rotates with the axle 26 and the rotating plate 12 relative to the fixed base plate 16. The base plate 16 has a radially extending slot 42 which accommodates a toothed rack 44 attached to a piston rod 45 of a hydraulic cylinder assembly 46 projecting outside the base plate 16. The rack 44 is engaged with the pinion gear 40 such that extension and retraction of piston rod 45 will swing the rotating plate 12 back and forth 180° in a manner to be more fully explained hereafter. The rotating plate is formed with a plurality of differently-sized and located holes, some of which are used to mount a mold as is represented by the tap hole 48. Other holes such as located radially outward of the tap hole 48 and indicated at 50 serve as female positioners for locating the mold. A pair of spaced apart, electronic sensors 52, 54 is mounted to the base plate 60 for verifying the position of the rotating plate 12.

In order to keep the rotating platen assembly 10 operating properly, a cooling system is provided which circulates fluid throughout the structure. This system includes a water jacket 56 which surrounds the lower portion of the axle 26. The water jacket 56 has a radially extending, circular head portion 58 disposed in the central region of the base plate 16 and the machine platen 14 and a cylindrical body portion 60 positioned in the machine platen 14. The preferred embodiment is designed with a series of eight similar, separate cooling fluid passages. Each passage has an inlet portion 62 which commences at a peripheral location of the base plate 16 and extends radially inward therein, proceeds through the head 58 and upper portions of the water jacket 56 and the upper portion of the center axle 26. Each passage also has an outlet portion 64 which passes through the top of the axle 26 and extends radially outwardly through the rotating plate 12 to a peripheral location thereon. In the cooling system illustrated, water is typically circulated throughout the eight passages. However, it should be appreciated, air or oil may also be employed to perform the same function.

An upper set of bearings 66 is disposed in the base plate 16 surrounding the upper portion of the axle 26 between the rotating plate 12 and the base plate 16. A lower set of bearings 68 is disposed between the water jacket 56 and the axle 26 and the lower ends thereof. In addition, a number of pipe plugs 70 are inserted at the bottom of the water jacket 56.

Turning now to FIGS. 1A, 3, 4 and 5, the rotating plate 12 is provided with an adjustable rotating stop 72 which travels along an arcuate (i.e. semi-circular) pocket or path 74 formed in the base plate 16. The base plate 16 has a first fixed or solid stop 76 defining a starting position for the rotating plate 12, and a second fixed or solid stop defining a finishing position for the rotating plate 12. In the preferred embodiment, the rotating plate 12 is designed to move 180° in one direction and then reverse its movement 180° in the opposite direction. It should be understood that the stop arrangement and the arcuate path 74 may be otherwise configured for different multi-shot molding.

Figure 4:
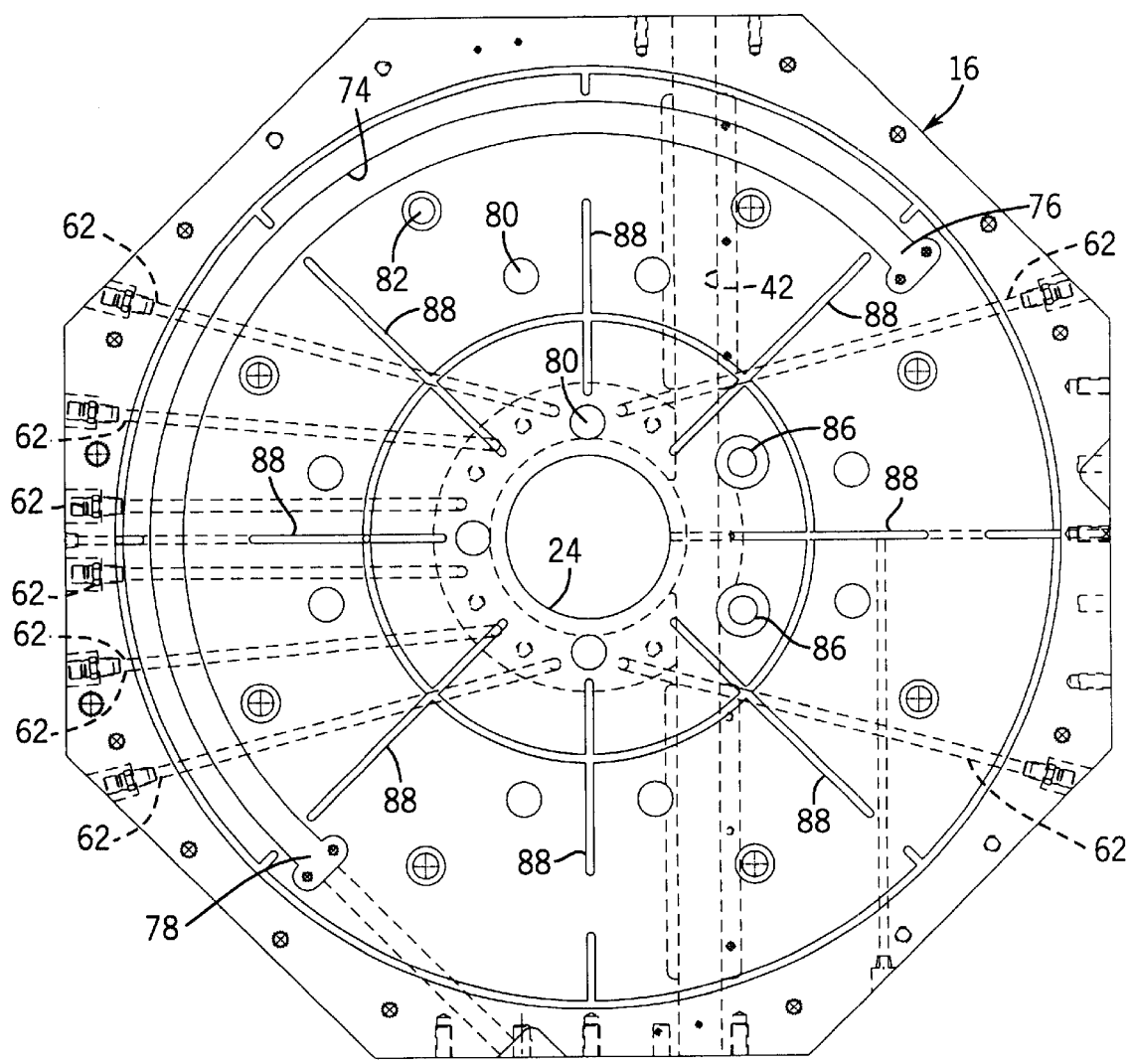
FIG. 4 is a plan view of the octagonal base plate.
Figure 5:
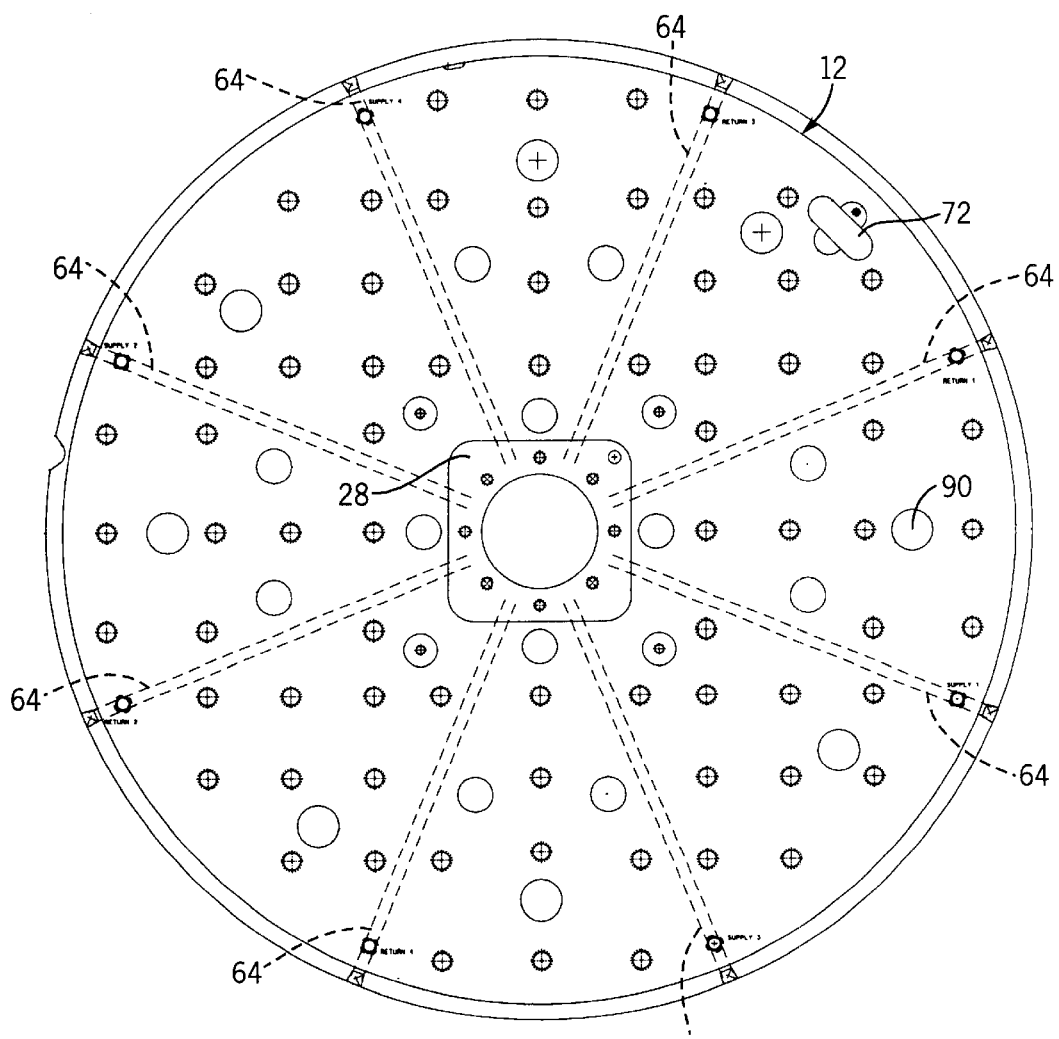
FIG. 5 is a plan view of the rotating plate.

As seen in FIG. 4, the base plate 16 is formed with a plurality of machine knockouts 80 and also a number of mounting screw holes 82 for receiving fasteners like 84 (FIG. 2) which join the base plate 16 to the machine platen 14. The base plate 16 also carries a pair of cam followers 86 which help hold the rack 44 against the pinion gear 40. Eight grease grooves 88 for lubricating purposes are also provided on the base plate 16. FIG. 5 illustrates a number of clearance holes 90 used to access fasteners 84.

In accordance with the invention, the rotary platen assembly 10 is provided with a shock absorber arrangement for dampening the momentum of the rotating plate 12 and the mold supported thereon between the starting position and the finishing position.

Figure 3:
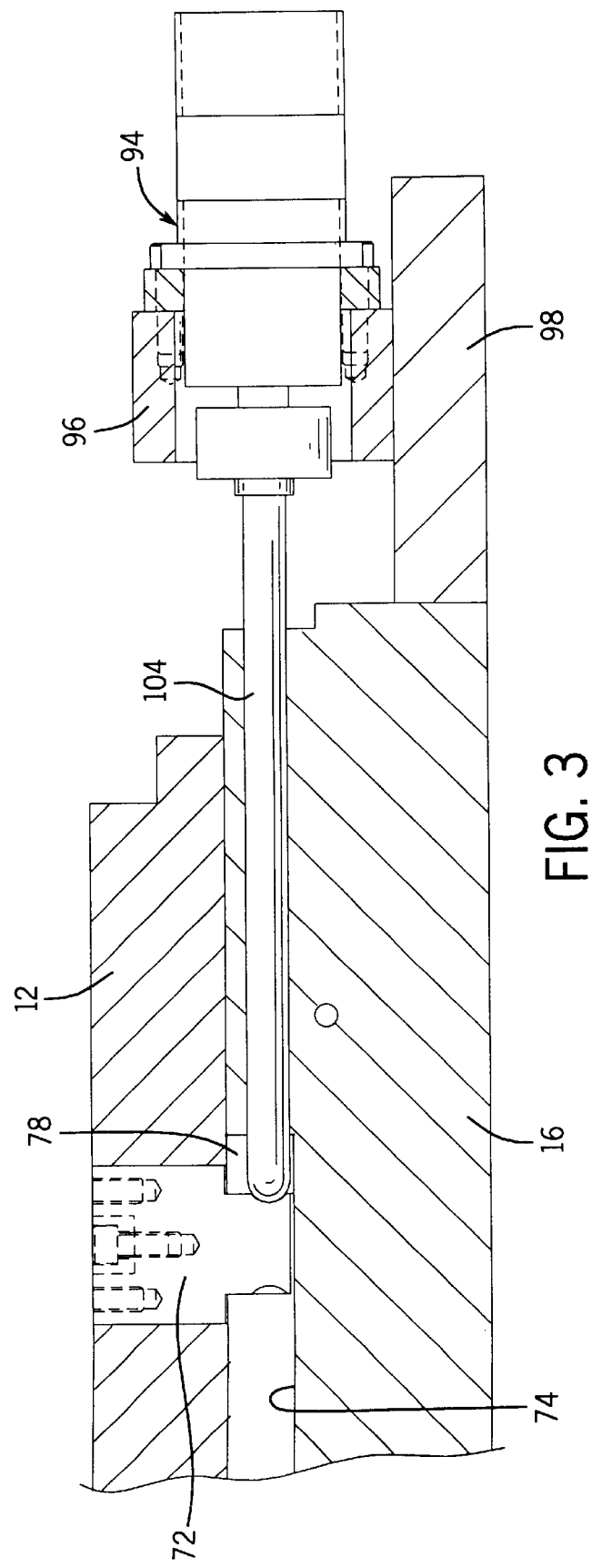
FIG. 3 is a sectional view taken on line 3—3 of FIG. 1A.

As depicted in FIGS. 1, 1A and 3, the shock absorber arrangement is comprised of a pair of shock absorbers 92, 94 of the type commercially available from Ace Control, Inc. of Farmington, Mich. Each shock absorber 92, 94 is disposed in a mounting sleeve 96 fixed on a mounting plate 98 extending from the base plate 16 and connected thereto by fasteners 100. Each shock absorber 92, 94 includes a respective elongated rod 102, 104 which extends slightly beyond a respective fixed stop 76, 78.

Actuation of the hydraulic cylinder assembly 46 will move the rack 44 into turning engagement with the pinion gear 40, so that the rotating plate 12 will rotate 180° counterclockwise in the semi-circular path 74 from a starting position (defined by engagement of the rotating stop 72 and the first fixed stop 76) toward the finishing position defined by the second fixed stop 78. Before the engagement of the rotating stop 72 with the second fixed stop 78, the rotating stop 72 will contact the rod end 104 of shock absorbers 94, which will decelerate or slow the rotating plate 12 and its mold so as to avoid a high impact stop which creates substantial wear and tear on the entire assembly 10. Further actuation of the hydraulic cylinder assembly 46 will rotate, the rotating plate 12 180° in the opposite or clockwise direction, causing rotating stop 72 to retrace its travel along path 74 and reengage with first fixed stop 76 after contacting the rod end 102 of shock absorber 92. It should be understood that the rotatable platen assembly 10 permits controlled movement of a rotary plate 12 and its mold through an arcuate path 74 to align openings in the mold to different injection nozzles discharging polymers of various colors and/or materials in order to produce plastic components of various colors and/or materials.

Unlike the prior art, the present invention provides a rotary platen assembly 10 which avoids the high manufacturing costs of a system which employs complicated electronic controls and limit switches to slow down and stop a rotary turntable-supported mold. The rotary platen assembly 10 permits the use of a rack and pinion drive arrangement for rotating mold loads in excess of 3,000 pounds and enables controlled slowing and stopping by virtue of the unique shock absorber and stop arrangement. As a result, molding cycle times can be shortened, so that molding production is maximized in a cost effective manner.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with the following claims.

We claim:

1. A rotatable platen assembly adapted to support a mold used in multi-shot plastic injection molding, the assembly comprising:
    a non-rotatable machine platen having a central bore formed therethrough;
    a non-rotatable base plate connected to the machine platen, the base plate having a central opening aligned with the central bore of the machine platen;
    a rotatable support plate adapted to retain a mold thereon, the plate being provided with a rotatable center axle passing through the central opening and the central bore and a gear mounted for rotation on the axle;
    a rack system engageable with the gear for rotating the mold supporting platen between a starting position and a finishing position; and
    a shock absorbing arrangement mounted externally of the base plate for dampening the momentum of the rotating plate between the starting position and the finishing position.

2. The assembly of claim 1, wherein the base plate is provided with a pair of fixed stops spaced apart and defining the starting position and the finishing position of the rotating plate.

3. The assembly of claim 1, wherein the rotating plate is provided with a rotating stop which travels in an arcuate path as the rotating plate rotates.

4. The assembly of claim 1, wherein the shock absorber arrangement includes a pair of shock absorbers secured on respective mounting plates connected to the base plate.

5. The assembly of claim 1, wherein the rack system includes a hydraulic cylinder having an extendable and retractable piston rod connected to a rack engageable with the gear.

6. The assembly of claim 5, wherein the base plate is formed with a slot for receiving the rack, and an arcuate path for guiding the rotating stop thereon.

7. The assembly of claim 1, including a water jacket surrounding the center axle, the water jacket having a radially extending head portion disposed in the base plate and the machine plate, and a cylindrical body portion located in the machine platen.

8. The assembly of claim 7, wherein the base plate, the water jacket, the center axle, and the rotating plate are all formed with a plurality of circuitous cooling fluid channels.

9. The assembly of claim 1, wherein the periphery of the rotating plate is engageable with a series of spaced apart gibs anchored to the base plate.

10. The assembly of claim 1, including a pair of spaced apart electronic sensors mounted on the base plate for verifying the position of the rotating plate.

11. The assembly of claim 1, including a first set of bearings disposed in the base plate and encircling the center axle.

12. The assembly of claim 7, including a second set of bearings disposed between the center axle and the water jacket.

13. The assembly of claim 7, wherein a lower portion of the center axle is provided with a set of vertically spaced O-rings disposed between an outer wall of the center axle and an inner wall of the body portion of the water jacket.

14. The assembly of claim 5, wherein the base plate is provided with a set of cam followers for holding the rack against the gear.

15. The assembly of claim 2, wherein the fixed stops are located 180° apart.

16. The assembly of claim 6, wherein the arcuate path is semi-circular.

17. In a multi-shot injection molding rotation apparatus having a rack system for moving a mold supporting rotating plate between a starting position and a finishing position relative to a non-rotating structure, the improvement comprising:
    a shock absorbing arrangement associated with the non-rotating structure for cushioning the momentum of the rotating plate as the rotating plate approaches the finishing position.

18. The apparatus of claim 17, wherein the non-rotating structure is provided with spaced apart stops along an arcuate path for defining the starting position and finishing position of the rotating plate.

19. The apparatus of claim 18, wherein the rotating plate is provided with a rotating stop engageable with the spaced apart stops.

* * * * *